United States Patent
Hong

(10) Patent No.: US 11,805,562 B2
(45) Date of Patent: Oct. 31, 2023

(54) USER DEVICE PAIRING METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 245 days.

(21) Appl. No.: 17/414,929

(22) PCT Filed: Dec. 17, 2018

(86) PCT No.: PCT/CN2018/121555
§ 371 (c)(1),
(2) Date: Jun. 16, 2021

(87) PCT Pub. No.: WO2020/124321
PCT Pub. Date: Jun. 25, 2020

(65) Prior Publication Data
US 2022/0070949 A1 Mar. 3, 2022

(51) Int. Cl.
*H04W 4/00* (2018.01)
*H04W 76/14* (2018.01)
(Continued)

(52) U.S. Cl.
CPC .......... *H04W 76/14* (2018.02); *G08G 5/0069* (2013.01); *H04W 48/16* (2013.01); *H04W 60/04* (2013.01); *H04W 84/06* (2013.01)

(58) Field of Classification Search
CPC ..... H04W 76/11; H04W 76/14; H04W 48/16; H04W 84/06; H04W 60/04; G08G 5/00; G08G 5/0069
(Continued)

(56) References Cited

U.S. PATENT DOCUMENTS 9,412,278 B1 * 8/2016 Gong ...................... G06F 21/44
9,870,566 B2 * 1/2018 Gong ...................... H04L 67/34
(Continued)

FOREIGN PATENT DOCUMENTS

CN 106100721 A 11/2016
CN 108093403 A 5/2018
(Continued)

OTHER PUBLICATIONS

International Search Report of PCT Application No. PCT/CN2018/121555 dated Sep. 18, 2019 with English translation, (4p).
(Continued)

*Primary Examiner* — Marceau Milord
(74) *Attorney, Agent, or Firm* — Arch & Lake LLP

(57) ABSTRACT

The present invention relates to a user device pairing method and apparatus. The method comprises: receiving a pairing request message, carrying a first identity identifier, sent by a first user device, the first user device being an unmanned aerial vehicle or an unmanned aerial vehicle controller; sending a query request message carrying the first identity identifier to an unmanned aerial vehicle traffic management (UTM); receiving a query response message which comprises a query result and is fed back by the UTM; when the query result comprises a second identity identifier of a second user device in a correlation between an unmanned aerial vehicle and an unmanned aerial vehicle controller, sending to the first user device a pairing response message carrying the second identity identifier, wherein when the first user device is an unmanned aerial vehicle, the second user device is an unmanned aerial vehicle controller, and when the first user device is an unmanned aerial vehicle controller, the second user device is an unmanned aerial vehicle.

20 Claims, 15 Drawing Sheets

(51) Int. Cl.
*G08G 5/00* (2006.01)
*H04W 48/16* (2009.01)
*H04W 60/04* (2009.01)
*H04W 84/06* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 11,367,081 | B2* | 6/2022 | Gong | G08G 5/0026 |
| 2011/0103293 | A1* | 5/2011 | Gale | H04W 88/10 |
| | | | | 370/315 |
| 2015/0254988 | A1* | 9/2015 | Wang | G08G 5/0021 |
| | | | | 701/3 |
| 2016/0029240 | A1* | 1/2016 | Wang | H04W 24/06 |
| | | | | 455/422.1 |
| 2016/0240087 | A1* | 8/2016 | Kube | G08G 5/0052 |
| 2016/0288905 | A1 | 10/2016 | Gong et al. | |
| 2016/0292403 | A1 | 10/2016 | Gong et al. | |
| 2016/0292696 | A1 | 10/2016 | Gong et al. | |
| 2017/0169713 | A1* | 6/2017 | Gong | G06F 21/6227 |
| 2018/0082308 | A1* | 3/2018 | Gong | G08G 5/0091 |
| 2018/0190130 | A1* | 7/2018 | Kube | G08G 5/0069 |
| 2018/0211263 | A1* | 7/2018 | Gong | G06F 8/65 |
| 2020/0015301 | A1* | 1/2020 | Zhang | H04B 7/185 |
| 2020/0186238 | A1* | 6/2020 | Hong | G05D 1/10 |
| 2020/0241572 | A1* | 7/2020 | Hong | G08G 5/0065 |
| 2020/0344661 | A1* | 10/2020 | Hong | G08G 5/003 |
| 2022/0327552 | A1* | 10/2022 | Gong | G08G 5/006 |

FOREIGN PATENT DOCUMENTS

| | | |
|---|---|---|
| CN | 109059900 A | 12/2018 |
| WO | 2018176312 A1 | 10/2018 |
| WO | 2018178750 A1 | 10/2018 |

OTHER PUBLICATIONS

First Office Action of the Chinese Application No. 201880002845.0, dated Apr. 6, 2022, with English translation, (15p).

English translation of the Written Opinion of the International Search Authority in the International Application No. PCT/CN2018/121555, dated Sep. 18, 2019, (4p).

Intel, "FS_ID_UAS: Update Definition and Use case 5.1", 3GPP TSG-SA WG1 Meeting #83 S1-182298, West Palm Beach, Florida USA, Aug. 20-24, 2018, (3p).

"3rd Generation Partnership Project; Technical Specification Group Services and System Aspects; Remote Identification of Unmanned Aerial Systems; Stage 1 (Release 16)", 3GPP TR 22.825 V1.0.0 (Sep. 2018), Technical Report, server date on Sep. 4, 2018, download by EPO, (22p).

Extended European Search Report in Application No. 18943694.2, dated Jun. 29, 2022, (9p).

* cited by examiner

USER DEVICE PAIRING METHOD AND APPARATUS

CROSS-REFERENCE TO RELATED APPLICATION

The present application is the U.S. national phase of PCT Application No. PCT/CN2018/121555, filed on Dec. 17, 2018, the content of which is incorporated hereby in its entirety for all purposes.

TECHNICAL FIELD

The present disclosure relates to the technical field of communications, and more particularly, to a method and device for pairing user devices.

BACKGROUND

In the related art, with the development of science and technology, Unmanned Aerial Vehicles (UAVs) are widely applied in fields such as aerial photography, transportation and monitoring. The UAV flies under the control of a controller. For the characteristic of long-distance flight of the UAV, it is required to perform long-distance communication between the UAV and the controller. As near-field communication modes such as Wireless Fidelity (WiFi) cannot meet the requirement of the long-distance communication, the UAV communicates with the controller through a mobile cellular network. The UAV and the controller are paired before connection. However, there is no effective solution yet on how to implement the pairing between the UAV and the controller in the mobile cellular network.

SUMMARY

The embodiments of the present disclosure provide a method and device for pairing user devices. The technical solutions are described as follows.

According to a first aspect of the embodiments of the present disclosure, a method for pairing user devices is provided, which includes operations as follows.

A pairing request message that is sent from a first user device and carries a first identity is received. The first user device includes an unmanned aerial vehicle (UAV) or a UAV controller.

A query request message carrying the first identity is sent to an Unmanned Aircraft System (UAS) Traffic Management (UTM).

A query response message that is fed back by the UTM and contains a query result is received.

When the query result includes a second identity of a second user device in correspondence between the UAV and the UAV controller, a pairing response message carrying the second identity is sent to the first user device. When the first user device is the UAV, the second user device is the UAV controller. When the first user device is the UAV controller, the second user device is the UAV.

The technical solution provided by the embodiment of the present disclosure can achieve the following beneficial effects. The embodiment provides an implementation solution that the UAV and the UAV controller are paired through a core network, thereby facilitating subsequent communication between the UAV and the UAV controller.

In an embodiment, the pairing request message is contained in attach request signaling, and the pairing response message is contained in attach accept signaling.

The technical solution provided by the embodiment of the present disclosure may achieve the following beneficial effect. The embodiment can implement a pairing process between the UAV and the UAV controller through an attach process, and implement transmission of the pairing response message through the attach accept signaling.

In an embodiment, when the query result includes query failure information, the pairing response message carries response information indicating that pairing is rejected.

The technical solution provided by the embodiment of the present disclosure can achieve the following beneficial effect. The embodiment supports a condition that the pairing is failed.

According to a second aspect of the embodiments of the present disclosure, a method for pairing user devices is provided, which is applied to a first user device, and include that operations as follows.

A pairing request message carrying a first identity is sent to a core network.

A pairing response message that is fed back by the core network and carries a second identity of a second user device is received. When the first user device is a Unmanned Aerial Vehicle (UAV), the second user device is a UAV controller. When the first user device is the UAV controller, the second user device is the UAV.

In an embodiment, the method further includes an operation as follows.

A binding request message is sent to the second user device according to the second identity.

In an embodiment, the operation that the binding request message is sent to the second user device according to the second identity includes an operation as follows.

The binding request message is sent to the second user device according to the second identity through one of the following networks: a mobile cellular network and a near-field communication network.

In an embodiment, the method further includes an operation as follows.

A pairing response message that is fed back by the core network and carries response information indicating that the pairing is rejected is received.

In an embodiment, the pairing request message is contained in attach request signaling, and the pairing response message is contained in attach accept signaling.

According to a third aspect of the embodiments of the present disclosure, a method for pairing user devices is provided, which is applied to a UTM side, and include operations as follows.

A query request message that is sent from a core network and carries a first identity of a first user device is received.

A second identity of a second user device in correspondence between a UAV and a UAV controller is queried. When the first user is the UAV, the second user device is the UAV controller, and when the first user device is the UAV controller, the second user device is the UAV.

When a query result includes the second identity, a query response message which carries the second identity is fed back to the core network.

In an embodiment, the method further includes an operation as follows.

When the query result includes query failure information, a query response message carrying the query failure information is fed back to the core network.

In an embodiment, the method further includes an operation as follows.

Correspondence, sent from a UAV manufacturer, between the UAV and the UAV controller is received According to a fourth aspect of the embodiments of the present disclosure, a device for pairing user devices is provided, which is applied to a core network, and include a first receiving module, a first sending module, a second receiving module and a second sending module.

The first receiving module is configured to receive a pairing request message that is sent from a first user device and carries a first identity. The first user device is a UAV or a UAV controller.

The first sending module is configured to send a query request message carrying the first identity to a UTM.

The second receiving module is configured to receive a query response message that is fed back by the UTM and contains a query result.

The second sending module is configured to send, when the query result includes a second identity of a second user device in correspondence between the UAV and the UAV controller, a pairing response message carrying the second identity to the first user device. When the first user device is the UAV, the second user device is the UAV controller. When the first user device is the UAV controller, the second user device is the UAV.

In an embodiment, the pairing request message is contained in attach request signaling, and the pairing response message is contained in attach accept signaling.

In an embodiment, when the query result includes query failure information, the pairing response message carries response information indicating that pairing is rejected.

According to a fifth aspect of the embodiments of the present disclosure, a device for pairing user devices is provided, which may be applied to a first user device, and include a first sending module and a first receiving module.

The first sending module is configured to send a pairing request message carrying a first identity to a core network.

The first receiving module is configured to receive a pairing response message that is fed back by the core network and carries a second identity of a second user device. When the first user device is a UAV, the second user device is a UAV controller. When the first user device is the UAV controller, the second user device is the UAV.

In an embodiment, the device further includes a second sending module.

The second sending module is configured to send a binding request message to the second user device according to the second identity.

In an embodiment, the second sending module further includes a sending submodule.

The second sending submodule is configured to send the binding request message to the second user device according to the second identity through one of the following networks: a mobile cellular network and a near-field communication network.

In an embodiment, the device further includes a second receiving module.

The second receiving module is configured to receive a pairing response message that is fed back by the core network and carries response information indicating that the pairing is rejected.

In an embodiment, the pairing request message is contained in attach request signaling; and the pairing response message is contained in attach accept signaling.

According to a sixth aspect of the embodiments of the present disclosure, a device for pairing user devices is provided, which is applied to a UTM side, and include a first receiving module, a querying module and a first sending module.

The first receiving module is configured to receive a query request message sent from a core network and carrying a first identity of a first user device.

The querying module is configured to query a second identity of a second user device in correspondence between a UAV and a UAV controller. When the first user is the UAV, the second user device is the UAV controller, and when the first user device is the UAV controller, the second user device is the UAV.

The first sending module is configured to feed, when a query result includes the second identity, a query response message carrying the second identity back to the core network.

In an embodiment, the device further includes a second sending module.

The second sending module is configured to feed, when the query result includes query failure information, a query response message carrying the query failure information back to the core network.

In an embodiment, the device further includes a second receiving module.

The second receiving module is configured to receive correspondence, sent from a UAV manufacturer, between the UAV and the UAV controller.

According to a seventh aspect of the embodiments of the present disclosure, a device for pairing user devices is provided, which may include a processor; and a memory configured to store a processor-executable instruction.

The processor is configured to: receive a pairing request message that is sent from a first user device and carries a first identity, where the first user device is a UAV or a UAV controller; send a query request message carrying the first identity to a UTM; receive a query response message fed back by the UTM and containing a query result; and send, when the query result includes a second identity of a second user device in the correspondence between the UAV and the UAV controller, a pairing response message carrying the second identity to the first user device. When the first user device is the UAV, the second user device is the UAV controller. When the first user device is the UAV controller, the second user device is the UAV.

According to an eighth aspect of the embodiments of the present disclosure, a device for pairing user devices is provided, which may include: a processor; and a memory configured to store a processor-executable instruction.

The processor is configured to: send a pairing request message carrying a first identity to a core network; and receive a pairing response message that is fed back by the core network and carries a second identity of a second user device. When the first user device is a UAV, the second user device is a UAV controller. When the first user device is the UAV controller, the second user device is the UAV.

According to an ninth aspect of the embodiments of the present disclosure, a device for pairing user devices is provided, which may include: a processor; and a memory configured to store a processor-executable instruction.

The processor is configured to: receive a query request message that is sent from a core network and carries a first identity of a first user device; query a second identity of a second user device in a correspondence between a UAV and a UAV controller, where when the first user is the UAV, the second user device is the UAV controller, and when the first user device is the UAV controller, the second user device is the UAV; feed, when a query result includes the second identity, a query response message carrying the second identity back to the core network.

According to a tenth aspect of the embodiments of the present disclosure, a computer-readable storage medium is provided, on which a computer instruction is stored. The instruction is executed by a processor to implement the method of the core network.

According to an eleventh aspect of the embodiments of the present disclosure, a computer-readable storage medium is provided, on which a computer instruction is stored. The instruction is executed by a processor to implement the method of the user device.

According to a twelfth aspect of the embodiments of the present disclosure, a computer-readable storage medium is provided, on which a computer instruction is stored. The instruction is executed by a processor to implement the method of the UTM side.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In the related art, with the development of science and technology, Unmanned Aerial Vehicles (UAVs) are widely applied in fields such as aerial photography, transportation and monitoring. The UAV flies under the control of a controller. For the characteristic of long-distance flight of the UAV, it is required to perform long-distance communication between the UAV and the controller. As near-field communication modes such as Wireless Fidelity (WiFi) cannot meet the requirement of the long-distance communication, the UAV communicates with the controller through a mobile cellular network. The UAV and the controller are paired before connection. However, there is no effective solution yet on how to implement the pairing between the UAV and the controller in the mobile cellular network.

In order to solve the above-mentioned problem, the embodiments provide an implementation solution that the UAV and the UAV controller are paired through a mobile cellular network. The mobile cellular network has characteristics of wide coverage and long-distance communication, thereby facilitating long-distance transmission between the UAV and the UAV controller.

Figure 1:
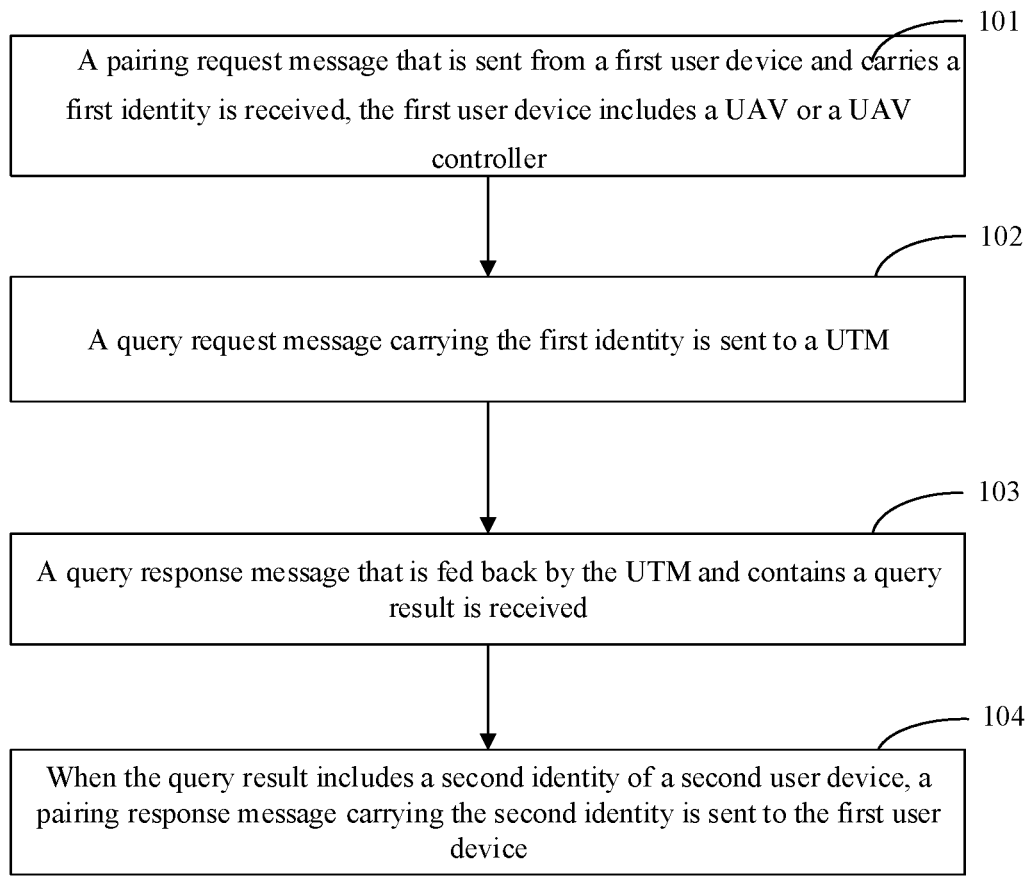
FIG. 1 is a flow chart showing a method for pairing user devices according to an exemplary embodiment.

FIG. 1 is a flow chart showing a method for pairing user devices according to an exemplary embodiment. The method for pairing user devices is applied to a device in a core network. As shown in FIG. 1, the method may include the following operations 101-104.

At operation 101, a pairing request message that is sent from a first user device and carries a first identity is received. The first user device includes a UAV or a UAV controller.

At operation 102, a query request message carrying the first identity is sent to a UTM.

At operation 103, a query response message that is fed back by the UTM and contains a query result is received.

At operation 104, when the query result includes a second identity of a second user device in a correspondence between the UAV and the UAV controller, a pairing response message carrying the second identity is sent to the first user device. When the first user device is the UAV, the second user device is the UAV controller, and when the first user device is the UAV controller, the second user device is the UAV.

In the embodiment, when the first user is the UAV, the second user device is the UAV controller, and when the first user device is the UAV controller, the second user device is the UAV.

Either the UAV or the UAV controller may automatically search a mobile cellular network after being started or restarted, and access to the mobile cellular network and send a pairing request message to the core network to request acquiring identity information of a peer device (the second user device), to complete a pairing process. Both the UAV and the UAV controller may respectively send the pairing request message to the core network, that is, the above process is executed for two times.

The correspondence between the UAV and the UAV controller is stored in the UTM. The UAV operator or the UAV manufacturer or the like may store the correspondence between the UAV and the UAV controller into the UTM in advance. As the UTM is not the device in the core network, the connection between the core network and the UTM is established in the embodiment. The core network may send a query request message to the UTM, so as to request querying a second identity corresponding to the first identity. The core network sends the queried second identity to the first user device, for completing the pairing between the first user device and the second user device. The first user device may communicate with the second user device subsequently through the mobile cellular network.

The core network may obtain the first identity through the pairing request message. The core network obtains the pairing request of the first user device on one hand, may further perform identity identification on the first identity on the other hand to determine whether the first identity conforms to an identity rule between the UAV and the UAV controller. The core network determines that the pairing request is an legal pairing request if the first identity conforms to the identity rule.

In an embodiment, the pairing request message is contained in attach request signaling, and the pairing response message is contained in attach accept signaling.

The pairing process between the UAV and the UAV controller can be implemented through an attach process in the embodiment. The pairing request is implemented through the attach request signaling, and the pairing response is implemented through the attach accept signaling, thereby saving network resources without increasing additional transmission process.

In an embodiment, when the query result includes query failure information, the pairing response message carries response information indicating that pairing is rejected.

In the embodiment, the UTM may not find the second identity corresponding to the first identity, that is, the query is failed. The core network notifies, through the pairing response message, the first user device that the pairing cannot be completed.

The foregoing describes the implementation process of the core network. Correspondingly, there are also improvement at the user device. The implementation process of the user device is described below.

Figure 2:
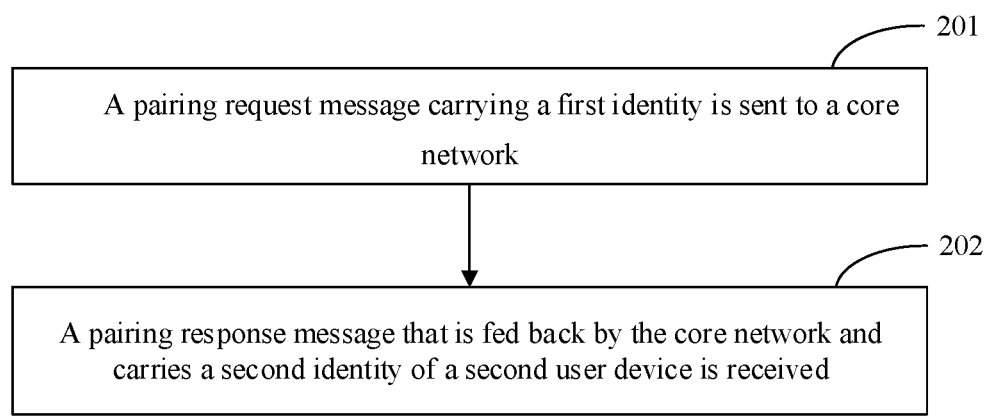
FIG. 2 is a flow chart showing a method for pairing user devices according to an exemplary embodiment.

FIG. 2 is a flow chart showing a method for pairing user devices according to an exemplary embodiment. The method for pairing user devices is applied to a terminal. The terminal may be a mobile phone, a computer, a digital broadcast terminal, a messaging device, a gaming console, a tablet, a medical device, exercise equipment, a Personal Digital Assistant (PDA), and the like. As shown in FIG. 2, the method may include the following operations 201-202.

At operation 201, a pairing request message carrying a first identity is sent to a core network.

At operation 202, a pairing response message that is fed back by the core network and carries a second identity of a second user device is received. When the first user device is a UAV, the second user device is a UAV controller, and when the first user device is the UAV controller, the second user device is the UAV.

In an embodiment, the above process may be implemented by the UAV or the UAV controller. Alternatively, both the UAV and the UAV controller may serve as the first user device to respectively execute the above process.

The first user device automatically searches the mobile cellular network after being started or restarted, accesses to the mobile cellular network, and sends a pairing request message to the core network to request acquiring identity information of a peer device (the second user device), and receives the second identity fed back by the core network, for completing the pairing process.

In an embodiment, the method may further include operation A.

At operation A, a binding request message is sent to the second user device according to the second identity.

After completing pairing, the first user device may directly communicate with the second user device to complete the binding process, and may further perform subsequent communication.

In an embodiment, operation A may include operation A1.

At operation A1, the binding request message is sent to the second user device according to the second identity through one of the following networks: a mobile cellular network and a near-field communication network.

In the embodiment, the first user device and the second user device may complete the binding process by continuing using the mobile cellular network, or through the near-field communication network (such as WiFi).

In an embodiment, the method may further include operation B.

At operation B, a pairing response message that is fed back by the core network and carries response information indicating that pairing is rejected is received.

In the embodiment, the first user device may receive the pairing response message indicating that pairing is rejected, i.e., the pairing between the first user device and the second user device is failed.

In an embodiment, the pairing request message is contained in attach request signaling, and the pairing response message is contained in attach accept signaling.

The pairing process between the UAV and the UAV controller can be implemented through an attach process in the embodiment. The pairing request is implemented through the attach request signaling, and the pairing response is implemented through the attach accept signaling, thereby saving network resources without increasing additional transmission process.

An implementation process of the user device is described below in detail with the embodiment.

Figure 3:
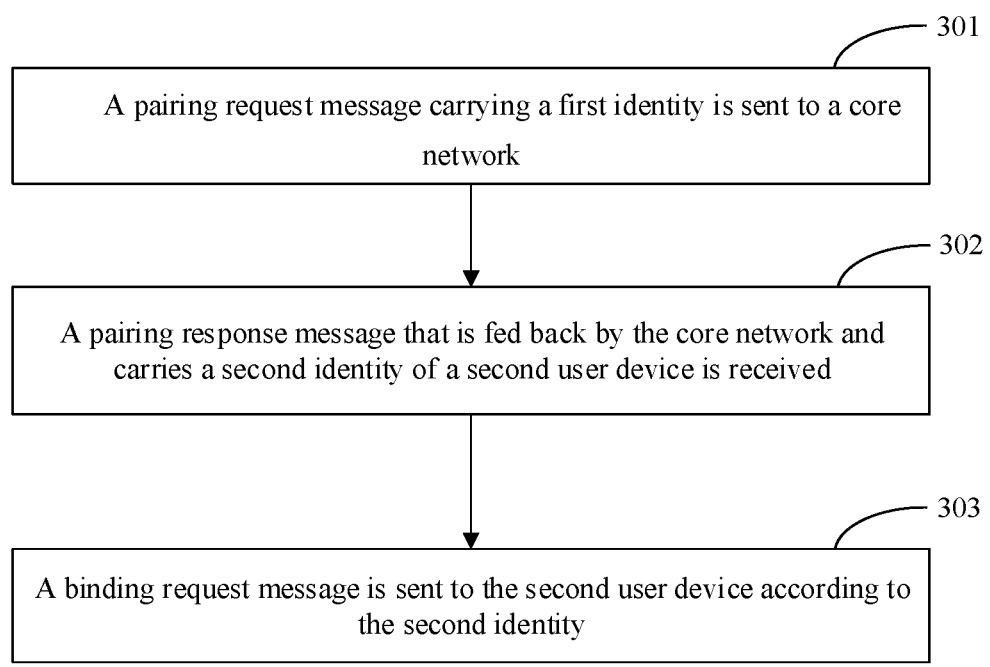
FIG. 3 is a flow chart showing a method for pairing user devices according to an exemplary embodiment.

FIG. 3 is a flow chart showing a method for pairing user devices according to an exemplary embodiment. The method for pairing user devices is applied in a terminal. The terminal may be a mobile phone, a computer, a digital broadcast terminal, a messaging device, a gaming console, a tablet, a medical device, exercise equipment, a PDA, and the like. As shown in FIG. 2, the method may include the following operations 301-303.

At operation 301, a pairing request message carrying a first identity is sent to a core network.

At operation 302, a pairing response message that is fed back by the core network and carries a second identity of a second user device is received. When the first user device is a UAV, the second user device is a UAV controller, and when the first user device is the UAV controller, the second user device is the UAV.

At operation 303, a binding request message is sent to the second user device according to the second identity.

The foregoing describes the implementation process of the core network and the user device. Correspondingly, there are also improvement at the UTM side. Hereinafter, the implementation process of the UTM side is described.

Figure 4:
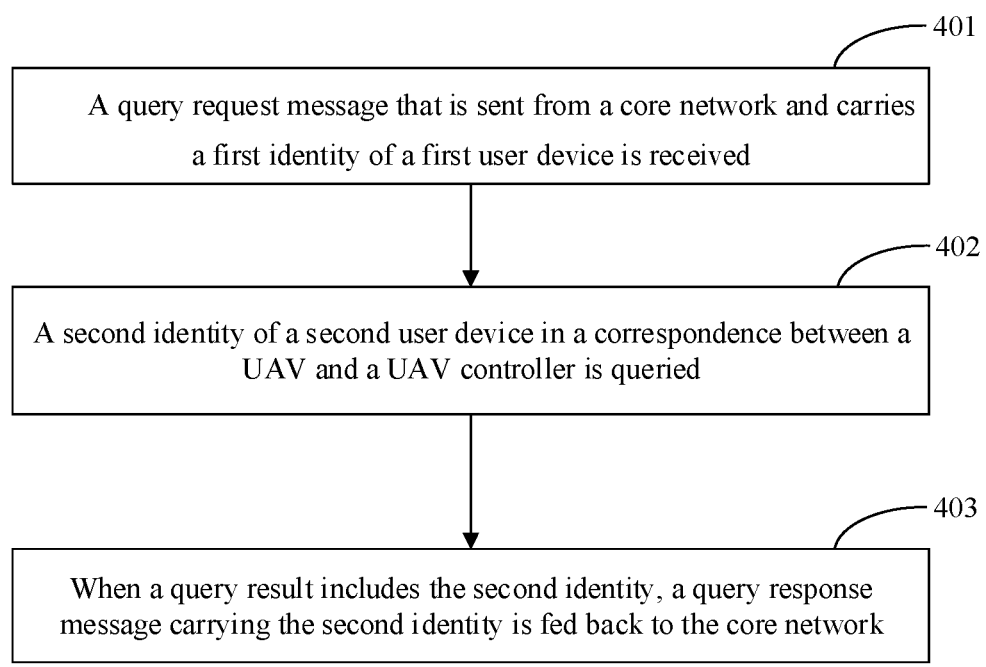
FIG. 4 is a flow chart showing a method for pairing user devices according to an exemplary embodiment.

FIG. 4 is a flow chart showing a method for pairing user devices according to an exemplary embodiment. The method for pairing user devices is applied to a UTM. As shown in FIG. 4, the method may include the following operations 401-403.

At operation 401, a query request message that is sent from a core network and carries a first identity of a first user device is received.

At operation 402, a second identity of a second user device in correspondence between a UAV and a UAV controller is queried. When the first user is the UAV, the second user device is the UAV controller, and when the first user device is the UAV controller, the second user device is the UAV.

At operation 403, when a query result includes the second identity, a query response message carrying the second identity is fed back to the core network.

In the embodiment, the correspondence between the UAV and the UAV controller is stored in the UTM. The UAV operator or the UAV manufacturer or the like may store the correspondence between the UAV and the UAV controller into the UTM in advance. As the UTM is not the device in the core network, the connection between the core network and the UTM is established in the embodiment. The core network may send a query request message to the UTM, to request querying the second identity corresponding to the first identity. Upon the reception of the query request message, the UTM queries the correspondence between the UAV and the UAV controller to the UTM, to obtain the second identity corresponding to the first identity and feed the query result back to the core network. The process helps the core network complete the pairing and identity authentication process between the UAV and the UAV controller.

In an embodiment, the method may further include operation C.

At operation C, when the query result includes query failure information, a query response message carrying the query failure information is fed back to the core network.

In the embodiment, when the query is failed, the UTM may feed the query response message carrying the query failure information back to the core network.

In an embodiment, the method may further include operation D.

At operation D, the correspondence sent from a UAV manufacturer, between the UAV and the UAV controller is received.

In the embodiment, the correspondence between the UAV and the UAV controller is stored in the UTM. The UAV operator or the UAV manufacturer or the like may pre-store the correspondence between the UAV and the UAV controller into the UTM.

The implementation process is described in combination with the core network, the user device and the UTM.

Figure 5:
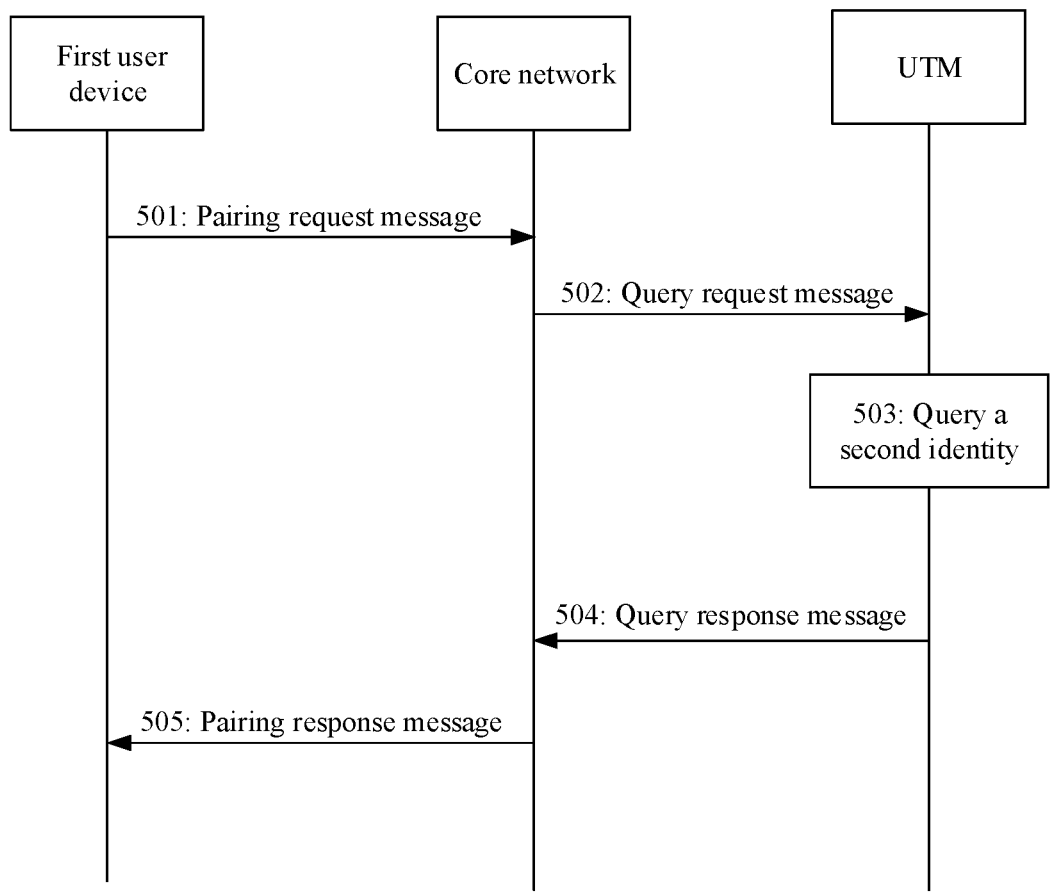
FIG. 5 is a flow chart showing a method for pairing user devices according to an exemplary embodiment.

FIG. 5 is a flow chart showing a method for pairing user devices according to an exemplary embodiment. As shown in FIG. 5, the method may include the following operations 501-505.

At operation 501, a first user device sends a pairing request message carrying a first identity to a core network.

At operation 502, the core network sends a pairing request message carrying the first identity to a UTM.

At operation 503, the UTM queries a second identity of a second user device in a correspondence between a UAV and a UAV controller.

At operation 504, when a query result includes the second identity, the UTM feeds a query response message carrying the second identity back to the core network.

At operation 505, the core network sends the pairing response message carrying the second identity to the first user device.

The above embodiments may be combined freely according to an actual need.

The device embodiments of the present disclosure are set forth hereinafter, and may be configured to execute the method embodiments of the present disclosure.

Figure 6:
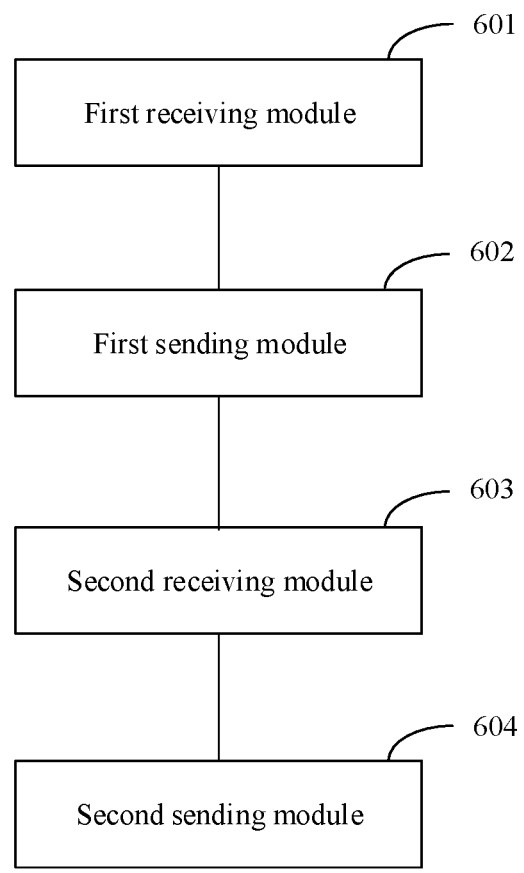
FIG. 6 is a block diagram illustrating a device for pairing user devices according to an exemplary embodiment.

FIG. 6 is a block diagram illustrating a device for pairing user devices according to an exemplary embodiment. The device may be implemented through software, hardware or a combination thereof to form a part or all of the electronic device. The device for pairing user devices is applied to a core network. Referring to FIG. 6, the device for pairing user devices may include a first receiving module 601, a first sending module 602, a second receiving module 603 and a second sending module 604.

The first receiving module 601 is configured to receive a pairing request message that is sent from a first user device and carries a first identity. The first user device includes a UAV or a UAV controller.

The first sending module 602 is configured to send a query request message carrying the first identity to a UTM.

The second receiving module 603 is configured to receive a query response message that is fed back by the UTM and contains a query result.

The second sending module 604 is configured to send, when the query result includes a second identity of a second user device in a correspondence between the UAV and the UAV controller, a pairing response message carrying the second identity to the first user device. When the first user device is the UAV, the second user device is the UAV controller, and when the first user device is the UAV controller, the second user device is the UAV.

In an embodiment, the pairing request message is contained in attach request signaling, and the pairing response message is contained in attach accept signaling.

In an embodiment, when the query result includes query failure information, the pairing response message carries response information indicating that the pairing is rejected.

Figure 7:
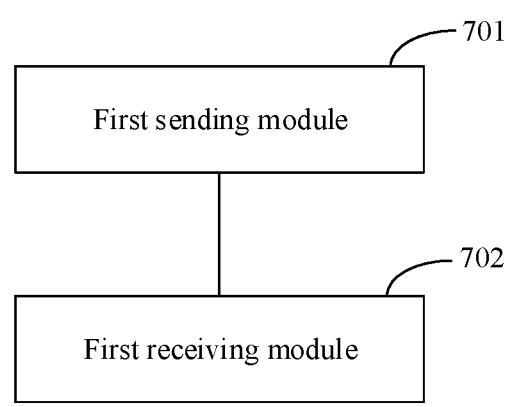
FIG. 7 is a block diagram illustrating a device for pairing user devices according to an exemplary embodiment.

FIG. 7 is a block diagram illustrating a device for pairing user devices according to an exemplary embodiment. The device may be implemented through software, hardware or a combination thereof to form a part or all of the electronic device. The device for pairing user devices is applied to a first user device. Referring to FIG. 7, the device for pairing user devices may include a first sending module 701 and a first receiving module 702.

The first sending module 701 is configured to send a pairing request message carrying a first identity to a core network.

The first receiving module 702 is configured to receive a pairing response message that is fed back by the core network and carries a second identity of a second user device. When the first user device is a UAV, the second user device is a UAV controller, and when the first user device is the UAV controller, the second user device is the UAV.

Figure 8:
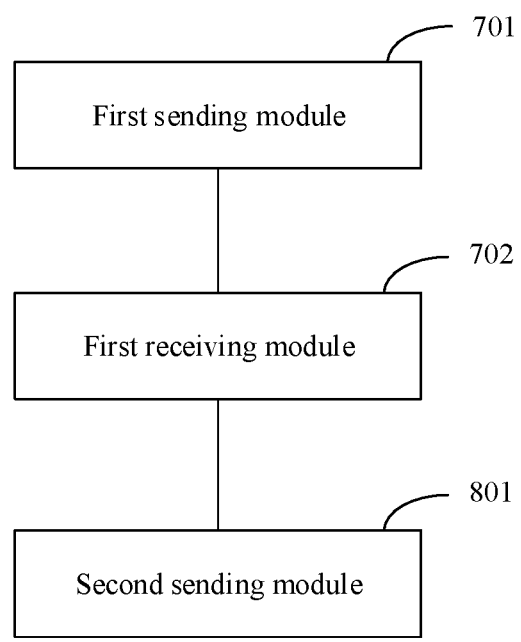
FIG. 8 is a block diagram illustrating a device for pairing user devices according to an exemplary embodiment.

In an embodiment, as shown in FIG. 8, the device may further include a second sending module 801.

The second sending module 801 is configured to send a binding request message to the second user device according to the second identity.

Figure 9:
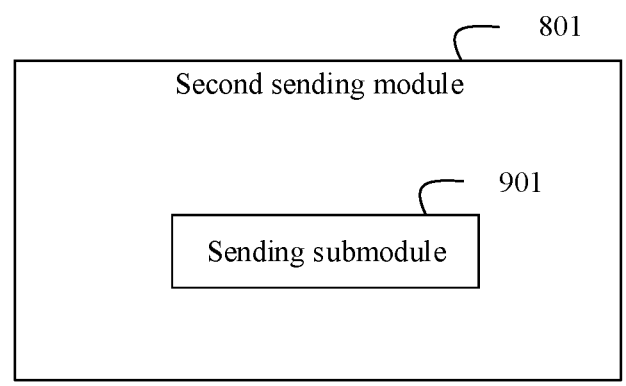
FIG. 9 is a block diagram illustrating a second sending module according to an exemplary embodiment.

In an embodiment, as shown in FIG. 9, the second sending module 801 may further include a sending submodule 901.

The second sending submodule 901 is configured to send the binding request message to the second user device according to the second identity through one of the following networks: a mobile cellular network and a near-field communication network.

Figure 10:
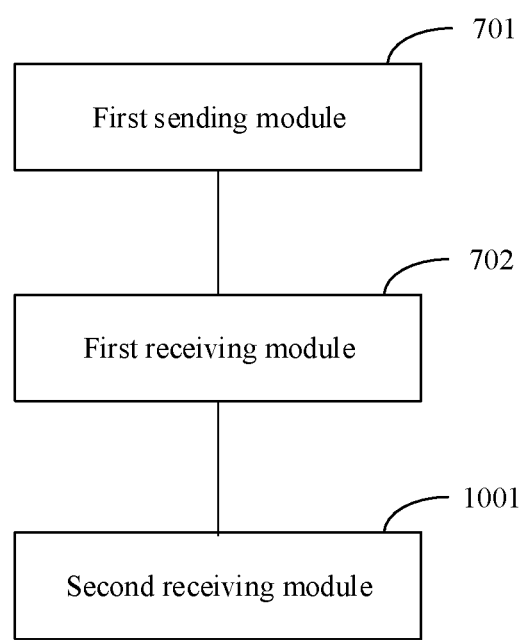
FIG. 10 is a block diagram illustrating a device for pairing user devices according to an exemplary embodiment.

In an embodiment, as shown in FIG. 10, the device may further include a second receiving module 1001.

The second receiving module 1001 is configured to receive a pairing response message that is fed back by the core network and carries response information indicating that pairing is rejected.

In an embodiment, the pairing request message is contained in attach request signaling; and the pairing response message is contained in attach accept signaling.

Figure 11:
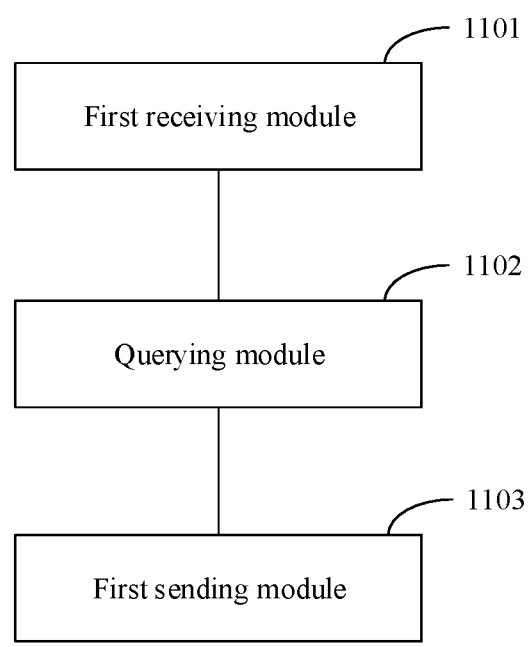
FIG. 11 is a block diagram illustrating a device for pairing user devices according to an exemplary embodiment.

FIG. 11 is a block diagram illustrating a device for pairing user devices according to an exemplary embodiment. The device may be implemented through software, hardware or a combination thereof to form a part or all of the electronic device. The device for pairing user devices is applied to a UTM side. Referring to FIG. 11, the device for pairing user devices may include a first receiving module 1101, a querying module 1102 and a first sending module 1103.

The first receiving module 1101 is configured to receive a query request message that is sent from a core network and carries a first identity of a first user device.

The querying module 1102 is configured to query a second identity of a second user device in a correspondence between a UAV and a UAV controller. When the first user is the UAV, the second user device is the UAV controller, and when the first user device is the UAV controller, the second user device is the UAV.

The first sending module 1103 is configured to feed, when a query result includes the second identity, a query response message carrying the second identity back to the core network.

Figure 12:
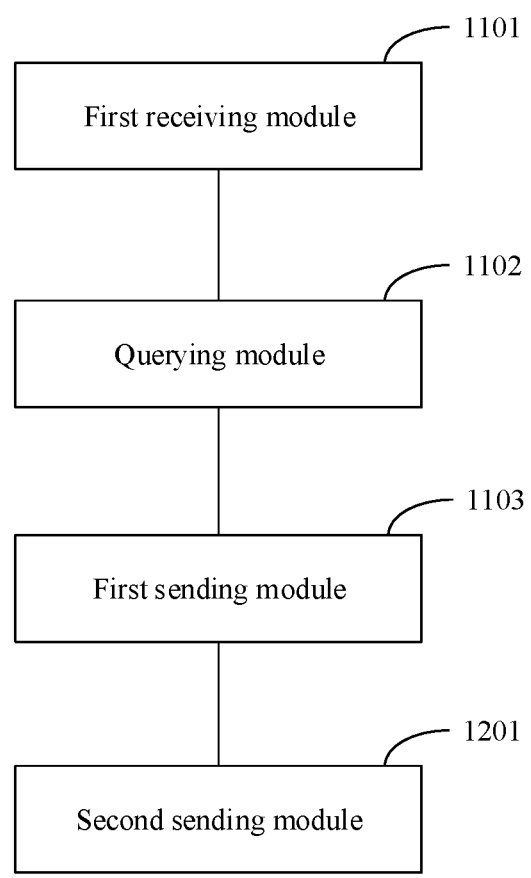
FIG. 12 is a block diagram illustrating a device for pairing user devices according to an exemplary embodiment.

In an embodiment, as shown in FIG. 12, the device may further include a second sending module 1201.

The second sending module 1201 is configured to feed, when the query result includes query failure information, a query response message carrying the query failure information back to the core network.

Figure 13:
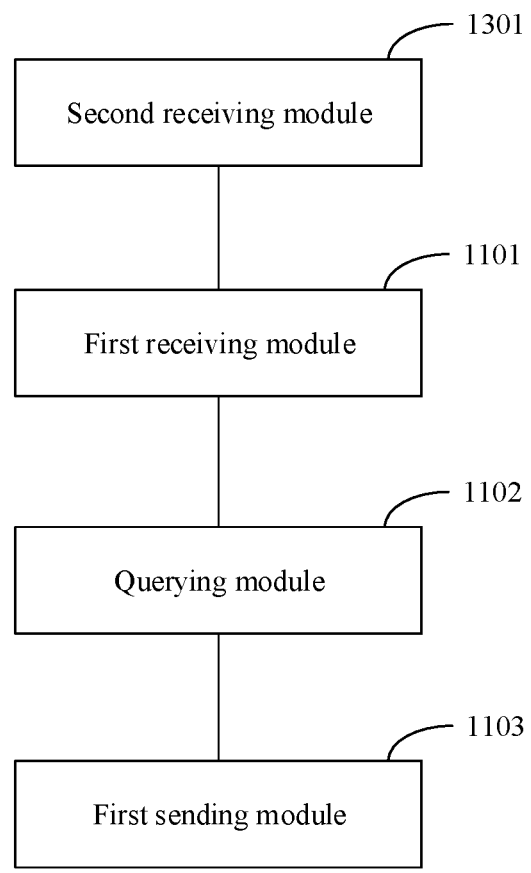
FIG. 13 is a block diagram illustrating a device for pairing user devices according to an exemplary embodiment.

In an embodiment, as shown in FIG. 13, the device may further include a second receiving module 1301.

The second receiving module 1301 is configured to receive the correspondence, sent from a UAV manufacturer, between the UAV and the UAV controller.

For the device in the above embodiments, the specific mode for the operation executed by each module has been described in detail in the embodiments related to the method, and is not elaborated herein.

Figure 14:
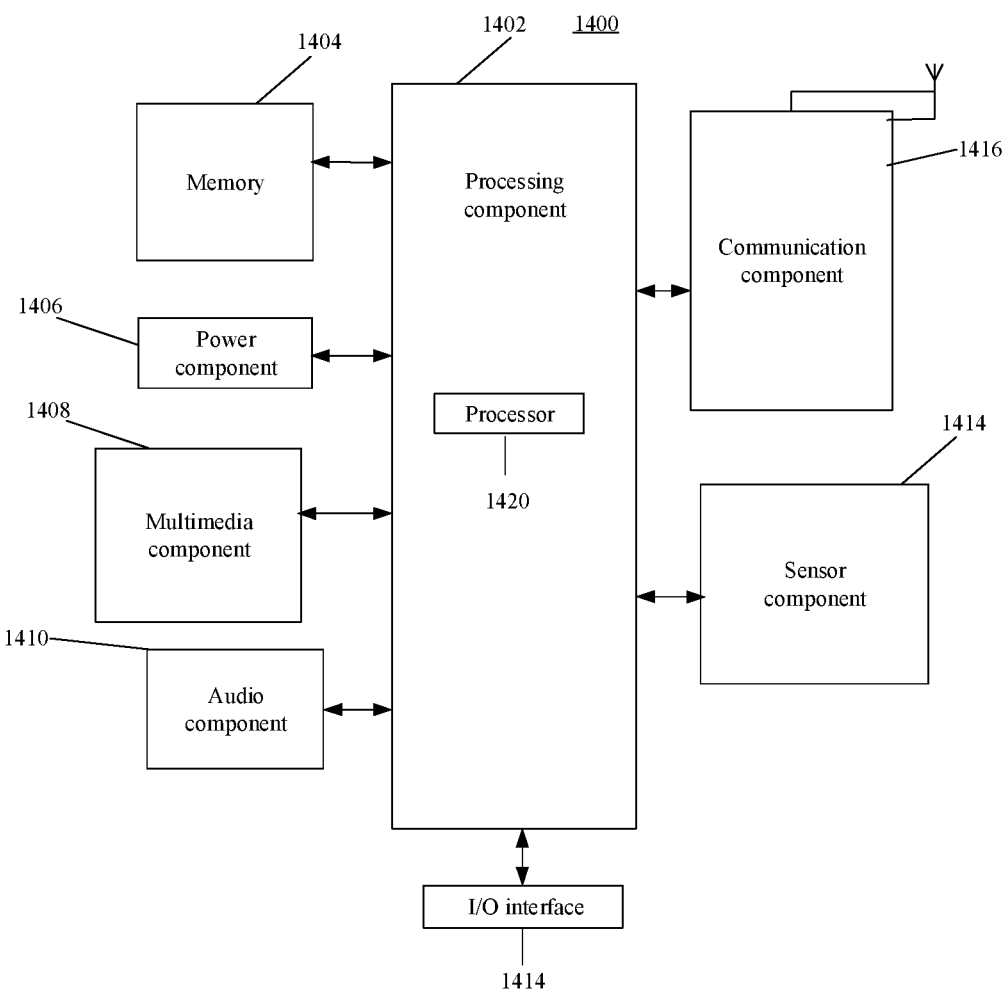
FIG. 14 is a block diagram illustrating a device applied for pairing user devices according to an exemplary embodiment.

FIG. 14 is a block diagram illustrating a device for pairing user devices according to an exemplary embodiment. For example, the device 1400 may be a mobile phone, a computer, a digital broadcast terminal, a messaging device, a gaming console, a tablet, a medical device, exercise equipment, a PDA, and the like.

The device 1400 may include one or more of the following components: a processing component 1402, a memory 1404, a power component 1406, a multimedia component 1408, an audio component 1410, an Input/Output (I/O) interface 1414, a sensor component 1414, and a communication component 1416.

The processing component 1402 typically controls overall operations of the device 1400, such as the operations associated with display, telephone calls, data communications, camera operations, and recording operations. The processing component 1402 may include one or more processors 1420 to execute instructions to perform all or part of the operations in the above described methods. Moreover, the processing component 1402 may include one or more modules which facilitate interaction between the processing component 1402 and other components. For instance, the processing component 1402 may include a multimedia module to facilitate interaction between the multimedia component 1408 and the processing component 1402.

The memory 1404 is configured to store various types of data to support the operation of the device 1400. Examples of such data include instructions for any applications or methods operated on the device 1400, contact data, phonebook data, messages, pictures, video, etc. The memory 1404 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 1406 provides power to various components of the device 1400. The power component 1406 may include a power management system, one or more power sources, and any other components associated with the generation, management, and distribution of power in the device 1400.

The multimedia component 1408 includes a screen providing an output interface between the device 1400 and the user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 1408 includes a front camera and/or a rear camera. The front camera and/or the rear camera may receive external multimedia data when the device 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a Microphone (MIC) configured to receive an external audio signal when the device 1400 is in an operation mode, such as a call mode, a recording mode, and a voice recognition mode. The received audio signal may further be stored in the memory 1404 or transmitted via the communication component 1416. In some embodiments, the audio component 1410 further includes a speaker configured to output audio signals.

The I/O interface 1414 provides an interface between the processing component 1402 and peripheral interface modules. The peripheral interface modules may be a keyboard, a click wheel, buttons, and the like. The buttons may include, but are not limited to, a home button, a volume button, a starting button, and a locking button.

The sensor component 1414 includes one or more sensors to provide status assessments of various aspects of the device 1400. For instance, the sensor component 1414 may detect an on/off status of the device 1400 and relative positioning of components. For example, the component is a display and small keyboard of the device 1400, and the sensor component 1414 may further detect a change in a position of the device 1400 or a component of the device 1400, presence or absence of contact between the user and the device 1400, orientation or acceleration/deceleration of the device 1400 and a change in temperature of the device 1400. The sensor component 1414 may include a proximity sensor, configured to detect the presence of nearby objects without any physical contact. The sensor component 1414 may also include a light sensor, such as a Complementary Metal Oxide Semiconductor (CMOS) or Charge Coupled Device (CCD) image sensor, configured for use in an imaging application. In some embodiments, the sensor component 1414 may also include an accelerometer sensor, a gyroscope sensor, a magnetic sensor, a pressure sensor, or a temperature sensor.

The communication component 1416 is configured to facilitate wired or wireless communication between the device 1400 and other devices. The device 1400 may access a communication-standard-based wireless network, such as a Wireless Fidelity (WiFi) network, a 2nd-Generation (2G) or 3rd-Generation (3G) network or a combination thereof In one exemplary embodiment, the communication component 1416 receives a broadcast signal or broadcast associated information from an external broadcast management system via a broadcast channel. In one exemplary embodiment, the communication component 1416 further includes a near field communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the device 1400 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, for performing the above described methods.

In an exemplary embodiment, a non-temporary computer readable storage medium including an instruction is further provided, for example, the memory 1404 including the instruction; and the instruction may be executed by the processor 1420 of the device 1400 to complete the above method. For example, the non-transitory computer-readable storage medium may be a Read Only Memory (ROM), a Random Access Memory (RAM), a Compact Disc Read-Only Memory (CD-ROM), a magnetic tape, a floppy disc, an optical data storage device and the like.

In an exemplary embodiment, a device for pairing user devices is provided, which includes: a processor; and a memory, configured to store a processor-executable instruction.

The processor is configured to: send a pairing request message carrying a first identity to a core network; and receive a pairing response message fed back by the core network and carrying a second identity of a second user device. When the first user device is a UAV, the second user device is a UAV controller, and when the first user device is the UAV controller, the second user device is the UAV.

The processor may further be configured to: send a binding request message to the second user device according to the second identity.

The processor may further be configured to, regarding sending the binding request message to the second user device according to the second identity, send the binding request message to the second user device according to the second identity through one of the following networks: a mobile cellular network and a near-field communication network.

The processor may further be configured to receive a pairing response message fed back by the core network and carrying response information indicating that pairing is rejected.

The processor may further be configured to contain the pairing request message in attach request signaling; and contain the pairing response message in attach accept signaling.

A computer-readable storage medium is provided, an instruction in the storage medium when executed by a processor of a device, enables the device to execute the method for pairing user devices. The method may include the following operations.

A pairing request message carrying a first identity is sent to a core network.

A pairing response message fed back by the core network and carrying a second identity of a second user device is received. When the first user device is a UAV, the second user device is a UAV controller, and when the first user device is the UAV controller, the second user device is the UAV.

The instruction in the storage medium may further include sending a binding request message to the second user device according to the second identity.

The instruction in the storage medium may further include, regarding sending the binding request message to the second user device according to the second identity, sending a binding request message to the second user device according to the second identity through one of the following networks: a mobile cellular network and a near-field communication network.

The instruction in the storage medium may further include: receiving a pairing response message fed back by the core network and carrying response information indicating that pairing is rejected.

The instruction in the storage medium may further include: containing the pairing request message in attach request signaling; and containing the pairing response message in attach accept signaling.

Figure 15:
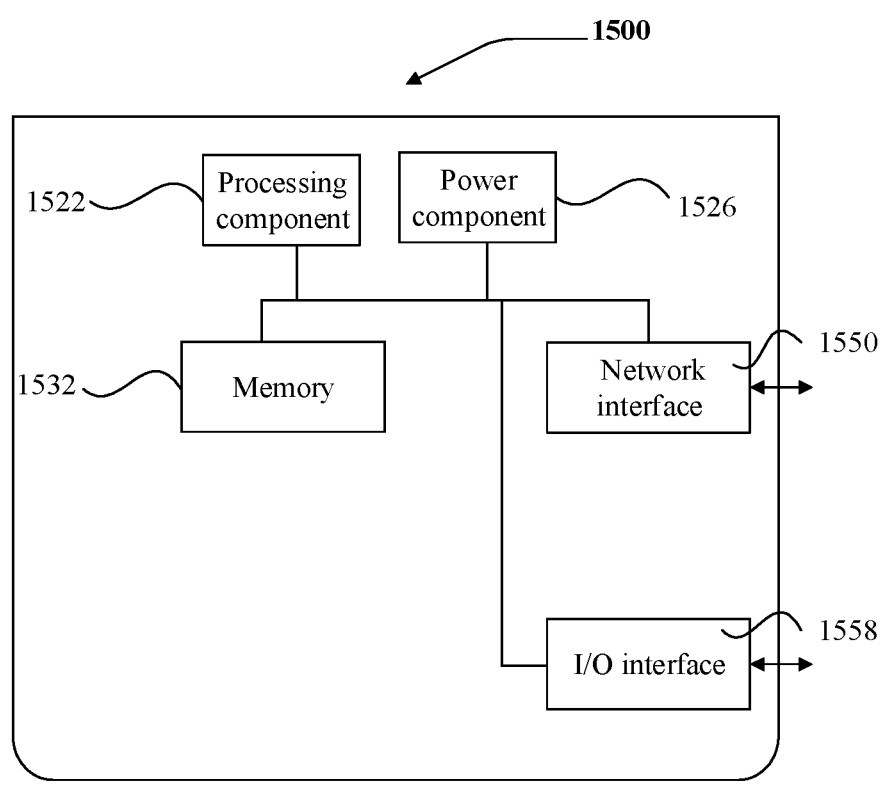
FIG. 15 is a block diagram illustrating a device applied for pairing user devices according to an exemplary embodiment.

FIG. 15 is a block diagram illustrating a device 1500 for synchronizing data according to an exemplary embodiment. For example, the device 1500 may be provided as a computer. Referring to FIG. 15, the device 1500 includes a processing component 1522, which further includes one or more processors, and a memory resource represented by a memory 1532 and configured to store an instruction that may be executed by the processing component 1522, such as an application program. The application program stored in the memory 1532 may include one or more modules, with each module corresponding to one set of instructions. In addition, the processing component 1522 is configured to execute the instruction to the above method for synchronizing data.

The device 1500 may further include a power component 1526, configured to execute power management of the device 1500, a wired or wireless network interface 1550 configured to connect the device 1500 to the network, and an I/O interface 1558. The device 1500 may be operated based on an operating system stored in the memory 1532, for example, Windows Server™, Mac OS X™, Unix™, Linux™, FreeBSD™ or the like.

In an exemplary embodiment, a device for pairing user devices is provided, which may include: a processor; and a memory, configured to store a processor-executable instruction.

The processor is configured to: receive a pairing request message sent from a first user device and carrying a first identity, the first user device being a UAV or a UAV controller; send a query request message carrying the first identity to a UTM; receive a query response message fed back by the UTM and including a query result; and send, when the query result includes a second identity of a second user device in a correspondence between the UAV and the UAV controller, a pairing response message carrying the second identity to the first user device. When the first user device is the UAV, the second user device is the UAV controller, and when the first user device is the UAV controller, the second user device is the UAV.

The processor may further be configured to enable the pairing request message to be contained in attach request signaling; and the pairing response message to be contained in attach accept signaling.

The processor may further be configured to: enable, when the query result includes query failure information, the pairing response message to carry response information indicating that pairing is rejected.

A computer-readable storage medium is provided. An instruction in the storage medium, when executed by a processor of a device, enables the device to execute the above method for pairing user devices. The method may include the following operations.

A pairing request message sent from a first user device and carrying a first identity is received. The first user device includes a UAV or a UAV controller.

A query request message carrying the first identity is sent to a UTM.

A query response message fed back by the UTM and containing a query result is received.

When the query result includes a second identity of a second user device in a correspondence between the UAV and the UAV controller, a pairing response message carrying the second identity is sent to the first user device. When the first user device is the UAV, the second user device is the UAV controller, and when the first user device is the UAV controller, the second user device is the UAV.

The instruction in the storage medium may further include containing the pairing request message in attach request signaling; and containing the pairing response message in attach accept signaling.

The instruction in the storage medium may further include, when the query result includes query failure information, the pairing response message carries response information indicating that the pairing is rejected.

In an exemplary embodiment, a device for pairing user devices is provided, which may include: a processor; and a memory, configured to store a processor-executable instruction.

The processor is configured to: receive a query request message sent from a core network and carrying a first identity of a first user device; query a second identity of a second user device in a correspondence between a UAV and a UAV controller, wherein when the first user is the UAV, the second user device is the UAV controller, where when the first user device is the UAV controller, the second user device is the UAV; and feed, when a query result includes the second identity, a query response message carrying the second identity back to the core network.

The processor may further be configured to: when the query result includes query failure information, feed a query response message carrying the query failure information back to the core network.

The processor may further be configured to receive the correspondence, sent from a UAV manufacturer, between the UAV and the UAV controller.

A computer-readable storage medium is provided. An instruction in the storage medium, when executed by a processor of a device, enables the device to execute the above method for pairing user devices. The method may include the following operations.

A query request message sent from a core network and carrying a first identity of a first user device is received.

A second identity of a second user device in a correspondence between a UAV and a UAV controller is queried. When the first user is the UAV, the second user device is the UAV controller, and when the first user device is the UAV controller, the second user device is the UAV.

When a query result includes the second identity, a query response message carrying the second identity is fed back to the core network.

The instruction in the storage medium may further include: when the query result includes query failure information, feeding a query response message carrying the query failure information back to the core network.

The instruction in the storage medium may further include: receiving the correspondence, sent from a UAV manufacturer, between the UAV and the UAV controller.

Other embodiments of the present disclosure will be apparent to those skilled in the art from consideration of the specification and practice of the present disclosure disclosed here. The disclosure is intended to cover any variations, uses, or adaptations of the disclosure conforming to the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. The scope of the present disclosure is only limited by the appended claims.

What is claimed is:

1. A method for pairing user devices, applied to a core network, and comprising:
    receiving a pairing request message that is sent from a first user device and carries a first identity of a first user device, wherein the first user device comprises an Unmanned Aerial Vehicle (UAV) or a UAV controller;
    sending a query request message carrying the first identity to an Unmanned Aircraft System (UAS) Traffic Management (UTM), to request the UTM to query a second identity of a second user device corresponding to the first identity in a correspondence between a UAV and a UAV controller, wherein the UTM is not a device in the core network, the correspondence between the UAV and the UAV controller is stored in the UTM by a UAV manufacturer in advance;
    receiving a query response message that is fed back by the UTM and contains a query result; and
    sending, when the query result comprises the second identity of the second user device in the correspondence between the UAV and the UAV controller, a pairing response message carrying the second identity to the first user device, wherein when the first user device is the UAV, the second user device is the UAV controller, and while the first user device is the UAV controller, the second user device is the UAV.

2. The method of claim 1, wherein the pairing request message is contained in attach request signaling, and the pairing response message is contained in attach accept signaling.

3. The method of claim 1, wherein when the query result comprises query failure information, the pairing response message carries response information indicating that pairing is rejected.

4. A device for pairing user devices, comprising:
one or more processors; and
a non-transitory computer-readable storage medium storing instructions executable by the one or more processors,
wherein the one or more processors are configured to implement the method of claim 1.

5. The device of claim 4, wherein the pairing request message is contained in attach request signaling, and the pairing response message is contained in attach accept signaling.

6. The device of claim 4, wherein when the query result comprises query failure information, the pairing response message carries response information indicating that pairing is rejected.

7. A method for pairing user devices, applied to a first user device, and comprising:
sending a pairing request message carrying a first identity of the first user device to a core network; and
receiving a pairing response message that is fed back by the core network and carries a second identity of a second user device, wherein when the first user device is an Unmanned Aerial Vehicle (UAV), the second user device is a UAV controller, and when the first user device is the UAV controller, the second user device is the UAV.

8. The method of claim 7, further comprising:
sending a binding request message to the second user device according to the second identity.

9. The method of claim 8, wherein sending the binding request message to the second user device according to the second identity comprises:
sending the binding request message to the second user device according to the second identity through one of following networks: a mobile cellular network and a near-field communication network.

10. The method of claim 7, further comprising:
receiving a pairing response message that is fed back by the core network and carries response information indicating that pairing is rejected.

11. The method of claim 7, wherein the pairing request message is contained in attach request signaling, and the pairing response message is contained in attach accept signaling.

12. A device for pairing user devices, comprising:
one or more processors; and
a non-transitory computer-readable storage medium storing instructions executable by the one or more processors,
wherein the one or more processors are configured to implement the method of claim 7.

13. The device of claim 12, further comprising a communication component configured to send a binding request message to the second user device according to the second identity.

14. The device of claim 13, wherein the communication component is further configured to send the binding request message to the second user device according to the second identity through one of following networks: a mobile cellular network and a near-field communication network.

15. The device of claim 12, wherein the communication component is configured to receive a pairing response message that is fed back by the core network and carries response information indicating that pairing is rejected.

16. A method for pairing user devices, applied to an Unmanned Aircraft System (UAS) Traffic Management (UTM), and comprising:
receiving a query request message that is sent from a core network and carries a first identity of a first user device;
querying a second identity of a second user device corresponding to the first identity of the first user device in a correspondence between an Unmanned Aerial Vehicle (UAV) and a UAV controller, wherein the UTM is not a device in the core network, the correspondence between the UAV and the UAV controller is stored in the UTM by a UAV manufacturer in advance, and wherein when the first user is the UAV, the second user device is the UAV controller, and while the first user device is the UAV controller, the second user device is the UAV; and
feeding, when a query result comprises the second identity, a query response message carrying the second identity back to the core network.

17. The method of claim 16, further comprising:
feeding, when the query result comprises query failure information, a query response message carrying the query failure information back to the core network.

18. The method of claim 16, further comprising:
receiving the correspondence, sent from a UAV manufacturer, between the UAV and the UAV controller.

19. A device for pairing user devices, comprising:
one or more processors; and
a non-transitory computer-readable storage medium storing instructions executable by the one or more processors,
wherein the one or more processors are configured to implement the method of claim 16.

20. The device of claim 19, wherein the processor is further configured to feed, when the query result comprises query failure information, a query response message carrying the query failure information back to the core network.

* * * * *